March 17, 1931.　　K. F. W. KEMPF　　1,796,793
KEY BOLT
Filed May 12, 1927
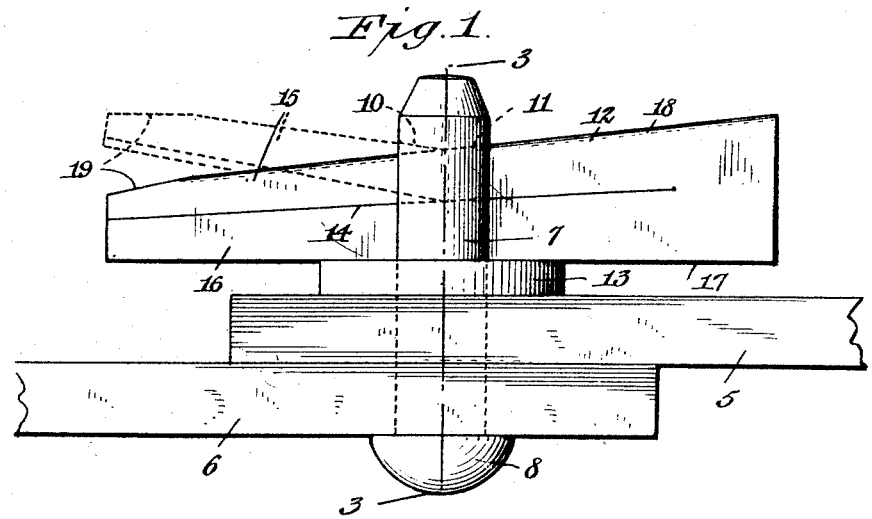
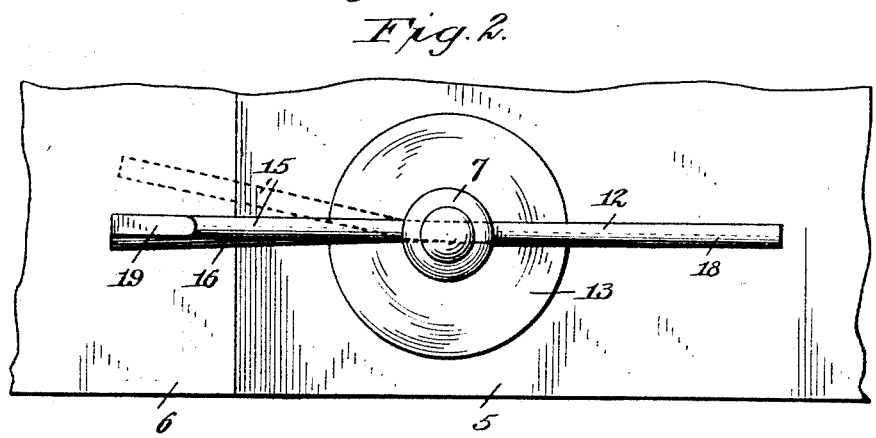
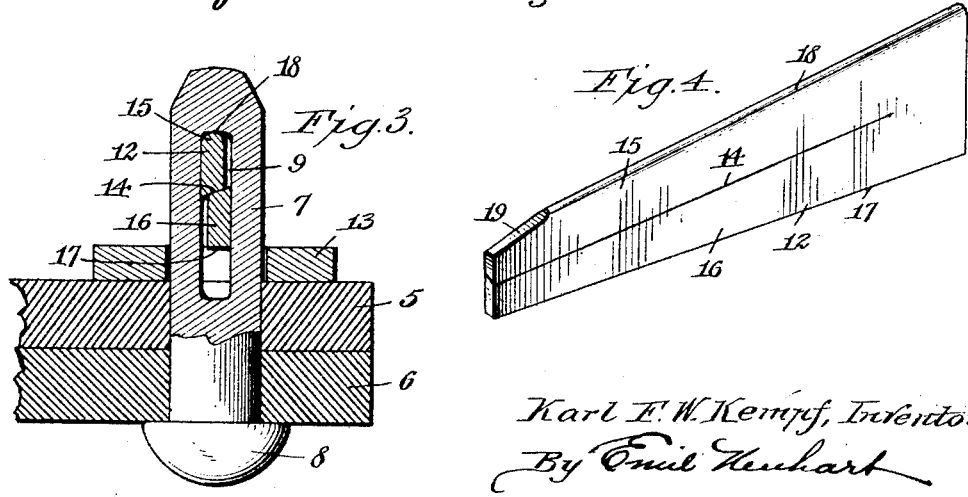
Karl F. W. Kempf, Inventor.
By Emil Neuhart
Attorney Patented Mar. 17, 1931

1,796,793

UNITED STATES PATENT OFFICE

KARL F. W. KEMPF, OF BUFFALO, NEW YORK

KEY BOLT

Application filed May 12, 1927. Serial No. 190,765.

My invention relates to improvements in key bolts, and more particularly to the lock or wedge key used in connection with the bolt proper.

Key bolts have heretofore been found to be deficient in serviceability when used in setting-up work subjected to jars or vibrations occasioned by the action of pneumatic hammers used for heading rivets, or to other causes tending to loosen the keys of the bolts; and for this reason, key bolts have not been generally used where the parts to be temporarily connected or joined are subjected to jars and vibrations prior to or during the permanent fastening of such parts together.

The primary object of my invention is to provide a key bolt with a wedge key which, when inserted into the slot of a key bolt, will have firm contact with the side walls of the slot as well as with one of the end walls thereof.

Another object of my invention is to so construct the key that, when driving the same within the slot of a key bolt, parts of the key along a portion of its length will become spread or disalined and impinge against the bolt along a greater area and, therefore, will not become loosened by vibrations or jarring of the elements or parts temporarily connected by the bolt.

A further object of my invention is the provision of a wedge key having two tongues normally alined, but which become disalined or spread when driven into a key.

A still further object of my invention is to provide a key for a key bolt which is slit or otherwise severed along a portion of its length so as to provide two longitudinal tongues, the slit extending transversely through the key at an obtuse angle to one side thereof and at an acute angle to the other side, the slit being therefore obliquely formed through the key to form corresponding bevels on the opposing edges of the tongues.

With the above and other objects to appear hereinafter, the invention consists in the novel features of construction, and in the arrangement and combination of parts to be hereinafter described and more particularly pointed out in the subjoined claims.

In the drawings:

Fig. 1 is an edge view of two metallic plates temporarily joined or connected together by means of a key bolt having my improved wedge key inserted therethrough.

Fig. 2 is a plan view of the parts shown in Fig. 1.

Fig. 3 is a transverse section taken on line 3—3, Fig. 1, the bolt proper being shown partially in section and partially in elevation.

Fig. 4 is a detached perspective view of my improved wedge key.

Key bolts, as stated, are employed for temporarily connecting two or more parts together with a view of permanently connecting the joint by means of rivets or other permanent fastening devices, and in the drawings I have shown these parts as represented by two metallic plates 5, 6, which are overlapped and adapted to be riveted together, said plates being provided with registering rivet holes along their marginal portions in the usual way, and at intervals along the plates, key bolts are inserted through registering rivet holes, the key bolt proper being designated by the numeral 7 and having the head 8 thereof in contact with one of the two plates, while the shank of the bolt extends through both plates and projects a distance outwardly beyond the other plate. This key bolt may be of any common construction, that shown being constructed according to the product resulting from my improved method of manufacturing key bolts, as set out in my co-pending application filed April 18, 1927, Serial No. 184,525, and according to which the key slot 9 within the shank of the bolt has its outer end wall beveled in opposite directions, as indicated at 10, 11, Fig. 1. This key slot extends from a point near the outer end of the shank of the bolt lengthwise along the shank a distance sufficient to assure one edge of a wedge key 12 riding in contact with the surface of the part through which the shank of the bolt extends, or as shown in the drawings, the inner edge of the wedge key rests upon a washer 13 slipped over the unheaded projecting end of the key bolt. In many cases this washer is dispensed with and it is therefore to be understood that the key 12 may be inserted into the slot 9 of the key bolt and driven into firm contact with the outer end wall of the slot.

This key is slitted transversely from its small end towards its large end, as at 14, so that the key may be said to be severed along the greater portion of its length to provide two tongues 15, 16, which are normally alined, as shown in Fig. 4. The slit formed in this wedge is cut obliquely in a transverse direction so that the opposing edges of the two tongues are correspondingly beveled or inclined transversely. The said opposing edges may be referred to as deflecting edges or means. Wedge keys of this general type are usually provided with a straight inner edge 17 at right angles to opposite sides of the key, while the outer or wedge edge of the key is preferably rounded, as at 18. The key is therefore tapered lengthwise and at its small end has an abrupt taper 19 to facilitate the entrance of the wedge key into the bolt when the parts being temporarily connected by the bolt are comparatively thick and the bolt does not project from these parts as much as illustrated in the drawings.

In the construction of the bolt, provision is made to assure the inner end of the key slot terminating within the parts being connected, as clearly illustrated in Fig. 3, or at least within the washer when such is used, and where the parts being connected are comparatively thick, the washer may be dispensed with. The operation of inserting the key within the bolt is a simple one, due to the fact that the outer end wall of the key slot in the bolt usually has a beveled portion conforming approximately to the taper of the key, and where a bolt is used having the double bevel shown in Fig. 1, the key may be conveniently inserted from either side of the bolt.

The tongues of the wedge key are alined, as stated, and this condition of the tongues is maintained when inserting the key into the key slot of the bolt. When the key is hammered or otherwise forced into the key slot so as to firmly bear against the parts connected, or the washer when used, and against the outer end wall of the key slot, the force employed will tend to crowd the two tongues together and any slight space existing between the opposing edges of the tongues is quickly taken up, after which, due to the fact that the key is slightly narrower than the key slot, as clearly shown in Fig. 3, the inner oblique or transversely-beveled edge of the outer tongue of the key will be caused to ride transversely over the outer oblique or transversely-beveled edge of the inner tongue. In fact, these tongues will tend to move laterally in opposite directions so that one side of the inner tongue will be forcibly driven against one side wall of the key slot, while the opposite side of the other tongue will be forcibly driven against the opposite side wall of the key slot, as clearly illustrated in Fig. 3. During this action, a diminution in the width of the key takes place along a portion of its length, although the edges of the key are retained in binding contact with the parts being temporarily connected, or with a washer, as the case may be, and with the outer end wall of the key slot; the lateral deflection of these tongues in opposite directions being gradually increased toward the smallest end of the key, as clearly shown in Fig. 2.

Although the construction of the key described, when driven into a key slot, will assure its retention within a key slot against any jars or vibrations to which the parts connected by the key bolt are subjected, the key can be removed from the bolt and re-used as many times as an ordinary key used in connection with a slotted key bolt. By driving the key in a reverse direction from that required to fasten it in place, the two tongues of the key gradually assume their normally alined positions as the key becomes loosened from the bolt, although it will be apparent that somewhat more force or power will be required to drive the key out of its slot than found necessary in removing an ordinary key from its key bolt.

A key of this kind can be used in connection with a slotted key bolt for permanently connecting parts together, and in such cases the upper tongue may be deflected laterally to the position shown in dotted lines in Fig. 2, and when so flexing this upper tongue the inner oblique or beveled edge of the outer tongue will ride up over the reversely beveled outer edge of the inner tongue, with the result that in addition to the outer tongue being moved laterally to the position shown in Fig. 2 or to a somewhat lesser or greater degree, this lateral movement is accompanied by a component upward movement of the tongue, with the result that the upper edge of this outer tongue will be forced in contact with the bevel 10 shown in Fig. 1, so that not only resistance against withdrawal of the key is provided by the key being infrictional or binding contact at its lower edge, its sides and its upper edge being in contact with the bevel 11, but the upper edge of the key is also in contact with the opposite bevel 10 at the outer end of the key slot, as clearly shown in Fig. 1. This upper tongue is therefore not only bent laterally, but also bent upwardly, making it necessary to drive the upper tongue from its elevated and laterally flexed position back to normal position, as shown in full lines in Fig. 2, before the key can be removed from the bolt.

It will be clear from the foregoing that key bolts heretofore constructed have had only two contacting surfaces, and these were limited to the edges of the key. The contacting surfaces of this improved wedge key are such that the superficial area of the key in contact with the walls of the slot and the parts being connected, or the washer used in conjunction therewith, are multiplied many times, and it will be clear that the side of one tongue driven in firm contact with one of the side walls of the key slot will have a greater binding effect than the two edges of the ordinary key slot. Therefore, by the use of this invention, applicant retains all the binding qualities of the ordinary wedge key in that it utilizes the edges of the key in the same manner as provided for in an ordinary key, and in addition thereto provides binding surfaces throughout the full width of each of the tongues of the key, which by reason of the employment of the beveled slit through the key will cause as effective a gripping action against the side wall of the key slot over a greater area than provided by the edges of the key.

Having thus described my invention, what I claim is:

1. A wedge key slit along a portion of its length and having the slit extending obliquely through the key to form two tongues with oppositely-beveled opposing edges.

2. The combination with a key bolt having a slot therein provided with a beveled outer end wall, of a wedge key inserted through said slot and slit along a portion of its length to form two tongues, said tongues having oppositely-beveled opposing edges adapted to ride laterally in contact with each other when said key is forcibly driven into said slot so as to cause said tongues to impinge against the opposite side walls of said key slot.

3. The combination of a key bolt having a slot extending lengthwise therethrough and provided with an outer end wall having oppositely beveled portions, a wedge key extending through said key slot and having its outer edge in contact with one of the beveled portions of said key slot, said wedge key being slit along a portion of its length to provide an outer and an inner tongue having oppositely beveled opposing edges to cause said tongues to be forcibly driven against the side walls of said key slot when driving said key in said slot, the outer tongue being adapted to be forced laterally to cause its inner beveled edge to ride laterally over the oppositely beveled outer edge of the inner tongue and the upper edge of the laterally forced portion of said outer tongue in contact with the other beveled portion at the outer end of said key slot.

4. The combination with a bolt having a key slot therein, of a wedge key entered into said slot and slit obliquely lengthwise along a portion of its length to provide an outer tongue having a beveled inner edge wall and an inner tongue having a correspondingly beveled outer edge wall in contact with the beveled inner edge wall of said outer tongue, the beveled edges of said tongues riding laterally against each other under force applied to the larger end of said wedge key to cause the outer tongue to bear against one side wall of said key slot and the inner tongue to bear against the other side wall of said key slot.

5. A wedge key slit along a portion of its length and having the slit extending obliquely through the key to form two normally alined parts in opposition to each other with oppositely beveled opposing edges, said opposing edges riding laterally in contact under pressure applied to the outer edges of the key along the region coextensive with said slit to force said normally alined parts out of alinement.

6. A wedge key adapted to be inserted through the slot of a key bolt, having two alined tongues provided with co-acting opposing faces adapted to cause said tongues to be moved out of true alinement under force applied to the large end of the key when inserted into said slot so as to cause at least one of said tongues to bear against at least one of the side walls of said slot.

7. A wedge key adapted to be inserted through a slot of a key bolt having two normally transversely-alined tongues provided with co-acting opposing faces adapted to cause relative movement of said tongues laterally within said slot under force applied to the larger end of the key when inserted in said slot so as to impinge against at least one wall of said slot at a side of said key in addition to impingement of the edges of said key against the ends of said slot.

In testimony whereof I affix my signature.

KARL F. W. KEMPF.